(12) United States Patent
Gomi et al.

(10) Patent No.: US 8,567,537 B2
(45) Date of Patent: Oct. 29, 2013

(54) INVERTED PENDULUM TYPE VEHICLE

(75) Inventors: Hiroshi Gomi, Wako (JP); Kazushi Hamaya, Wako (JP); Kazushi Akimoto, Wako (JP); Yuichi Uebayashi, Wako (JP); Shinichiro Kobashi, Wako (JP); Hironori Waita, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 164 days.

(21) Appl. No.: 12/884,748

(22) Filed: Sep. 17, 2010

(65) Prior Publication Data

US 2011/0067938 A1  Mar. 24, 2011

(30) Foreign Application Priority Data

Sep. 18, 2009 (JP) ................... 2009-217824
Sep. 18, 2009 (JP) ................... 2009-217847
Sep. 18, 2009 (JP) ................... 2009-217848
Sep. 18, 2009 (JP) ................... 2009-217921

(51) Int. Cl.
*B62K 15/00* (2006.01)
*B62K 11/02* (2006.01)

(52) U.S. Cl.
USPC .............................. 180/21; 180/6.2; 180/208

(58) Field of Classification Search
USPC .................. 180/6.2, 6.24, 6.5, 6.58, 21, 208
See application file for complete search history.

(56) References Cited

U.S. PATENT DOCUMENTS

| 1,654,862 A | 12/1925 | Clyne |
| 3,399,742 A * | 9/1968 | Malick ........................ 180/21 |
| 5,701,965 A * | 12/1997 | Kamen et al. ................ 180/7.1 |
| 5,791,425 A * | 8/1998 | Kamen et al. ................ 180/7.1 |
| 6,150,794 A | 11/2000 | Yamada et al. |

(Continued)

FOREIGN PATENT DOCUMENTS

| JP | 2003-79006 A | 3/2003 |
| JP | 2006074868 | 3/2006 |

(Continued)

OTHER PUBLICATIONS

Hiroshi Gomi et al., U.S. Patent Application titled "Frictional Drive Device and Inverted Pendulum Type Vehicle Using the Same", Filing Date: Sep. 17, 2010, U.S. Appl. No. 12/884,738, specification and drawings, a total of 51 pages.

(Continued)

*Primary Examiner* — Joseph Rocca
*Assistant Examiner* — Timothy Wilhelm
(74) *Attorney, Agent, or Firm* — Squire Sanders (US) LLP

(57) ABSTRACT

In an inverted pendulum type vehicle having a lower frame (22) and an upper frame (21) detachably joined to an upper end of the lower frame, the lower and upper frames each defining a hollow interior, a drive unit (3) is incorporated in the lower frame, and a battery unit (10) is received in the upper frame and configured to supply electric power to the drive unit via an electric unit (11) received in a narrow section intermediate between the upper and lower frames. Thereby, the vehicle may be of a compact and small foot print design. In particular, when this structure is applied to a vehicle using a main wheel having a relatively small width, by matching the upper part of the vehicle to have a corresponding small width, the overall profile of the vehicle may have a highly small width. Furthermore, the total weight of the vehicle can be relatively evenly distributed between the upper and lower parts for easy handling and control.

12 Claims, 11 Drawing Sheets

(56) References Cited

U.S. PATENT DOCUMENTS

| | | | |
|---|---|---|---|
| 7,337,862 B1* | 3/2008 | Greenley et al. | 180/10 |
| 7,424,927 B2* | 9/2008 | Hiramatsu | 180/282 |
| 7,823,676 B2* | 11/2010 | Yamada et al. | 180/218 |
| 7,866,429 B2* | 1/2011 | Ishii et al. | 180/218 |
| 7,963,352 B2* | 6/2011 | Alexander | 180/21 |
| 8,011,459 B2* | 9/2011 | Serai et al. | 180/8.2 |
| 8,016,060 B2* | 9/2011 | Miki et al. | 180/65.1 |
| 8,050,837 B2* | 11/2011 | Yamada | 701/70 |
| 8,155,828 B2* | 4/2012 | Fuwa et al. | 701/36 |
| 2001/0000394 A1 | 4/2001 | Whittaker | |
| 2008/0147281 A1* | 6/2008 | Ishii et al. | 701/49 |
| 2008/0284375 A1* | 11/2008 | Nagaoka et al. | 320/116 |
| 2009/0266629 A1* | 10/2009 | Simeray et al. | 180/65.51 |
| 2009/0288900 A1* | 11/2009 | Takenaka et al. | 180/218 |
| 2010/0023220 A1* | 1/2010 | Nakashima et al. | 701/42 |
| 2010/0063719 A1* | 3/2010 | Doi | 701/124 |
| 2011/0067937 A1* | 3/2011 | Gomi et al. | 180/21 |

FOREIGN PATENT DOCUMENTS

| | | |
|---|---|---|
| JP | 2006-282160 | 10/2006 |
| JP | 2009-106138 | 5/2009 |
| WO | 2008/132779 | 11/2008 |

OTHER PUBLICATIONS

Hiroshi Gomi et al., U.S. Patent Application titled "Recharging System for a Rechargeable Battery of an Inverted Pendulum Type Vehicle", Filing Date: Sep. 17, 2010, U.S. Appl. No. 12/884,724, specification and drawings, a total of 81 pages.

Japanese Office Action dated Jun. 14, 2012 for corresponding JP Application No. 2009-273363.

Non-Final Office Action, dated Oct. 26, 2012, issued in related U.S. Appl. No. 12/884,724.

* cited by examiner

Fig.11a
Fig.11b
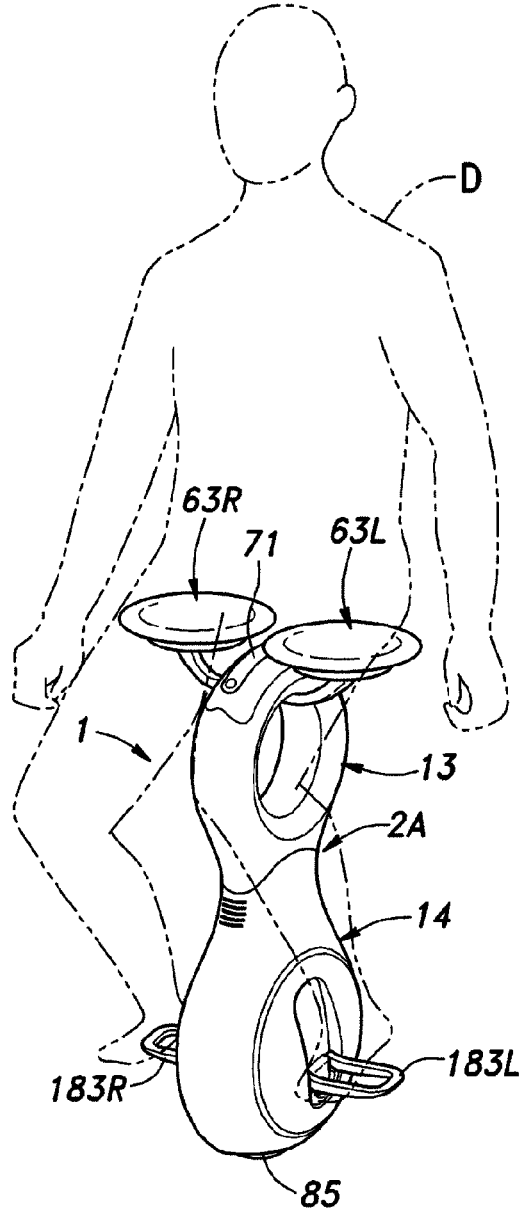
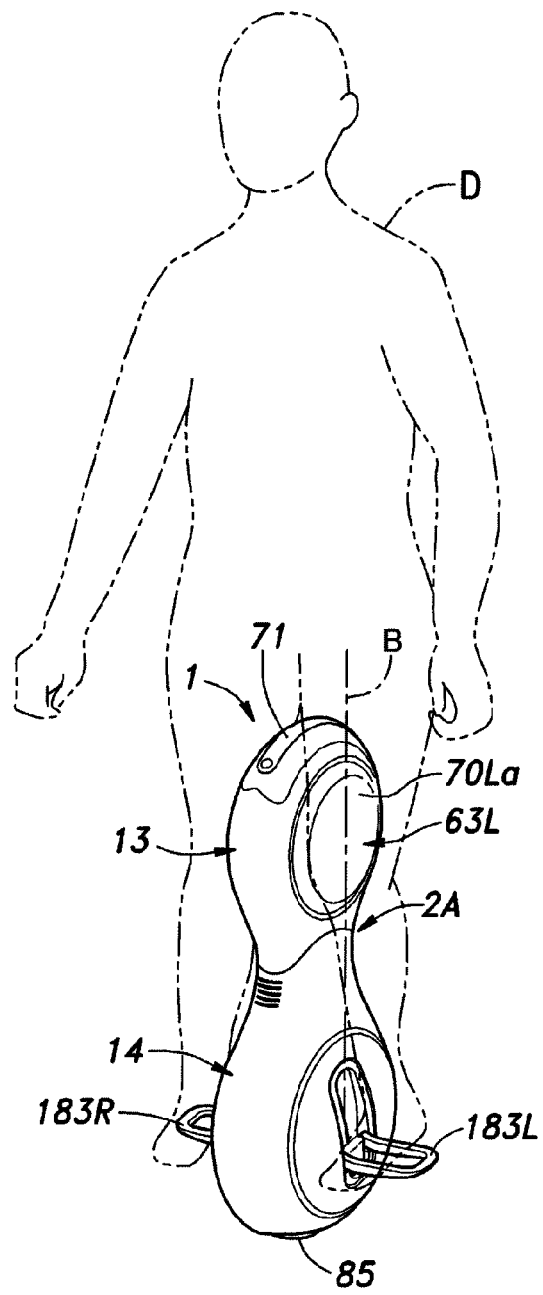

INVERTED PENDULUM TYPE VEHICLE

TECHNICAL FIELD

The present invention relates to an inverted pendulum type vehicle, and in particular to a monocycle type vehicle operating under an inverted pendulum control.

BACKGROUND OF THE INVENTION

Known is an inverted pendulum type vehicle or an omni-directional vehicle comprising a pair of drive assemblies individually actuated by electric motors and a main wheel held between the drive assemblies and frictionally driven by the drive assemblies. See WO2008132779A1 (US20100096905A1) (patent document 1) for instance. Each drive assembly comprises a drive disk coaxially opposing the drive disk of the other drive assembly and a plurality of drive rollers obliquely arranged along the circumference of the drive disk at a regular interval so as to be individually rotatable. The main wheel comprises a ring-shaped annular member rotatably supported by a frame around a central axial line thereof and a plurality of driven rollers arranged along the circumference of the annular member so as to be rotatable around the respective tangential lines. As the drive disks are turned by the electric motors, the driven rollers are frictionally driven by the drive rollers. When the drive rollers are turned around the tangential directions of the main wheel, the vehicle is driven in a lateral direction. When the main wheel is turned around the central axial line thereof, the vehicle is driven in a fore and aft direction. The direction of motion of the vehicle can be selected as desired by suitably adjusting the difference between the rotational speeds of the two drive disks.

The vehicles of this type are suited to have a small footprint (area of the image of the vehicle projected on the ground surface), and this enables the vehicle to travel in narrow spaces. Japanese patent laid open publication No. 2006-282160 (patent document 2) discloses such an inverted pendulum type vehicle comprising a robot main body consisting of a spherical wheel and an omni-directional drive unit for rolling the spherical wheel in a desired direction, and a control unit for maintaining the robot main body in an upright posture under an inverted pendulum control.

In this vehicle, the robot main body further includes a casing receiving a battery, a control computer, motor drivers, a gyro sensors and other control components, and a protective cover attached to a lower part of the casing and covers the omni-directional drive unit. When this structure is applied to an inverted pendulum vehicle using a main wheel having a relatively small width, the protective cover may have a small width, but the casing is required to have a large width that does not match the narrow width of the protective cover. Therefore, the vehicle is prevented from having a small footprint.

Furthermore, the amount of the wiring connecting various parts of the vehicle is desired to be minimized for a compact and small foot print design of the vehicle. Also, the wiring is required to be accessible for assembly and maintenance purposes.

In an inverted pendulum control of a vehicle, it is important to detect the inclination angle of the vehicle without time delay. An inclination angle typically consists of a gyro sensor. However, when the sensor is provided in a part of the vehicle remote from the gravitational center of the vehicle, the motion of the vehicle is given as a combination of the motion of the gravitational center of the vehicle and the motion of the mounting point of the sensor with respect to the gravitational sensor. Therefore, the computational load can be minimized if the inclination sensor (gyro sensor) is mounted on the gravitational center of the vehicle.

An inverted pendulum type vehicle typically includes a rechargeable batter, a drive unit and an electric unit for controlling the supply of electric power from the battery to the drive unit, and these form three major assemblies that account for a large part of the weight and bulk of the vehicle. It is therefore important to arrange them that the vehicle may be compactly designed, and the accessibility of various components may be ensured.

BRIEF SUMMARY OF THE INVENTION

In view of such problems of the prior art, a primary object of the present invention is to provide an inverted pendulum type vehicle of a compact and small foot print design.

A second object of the present invention is to provide an inverted pendulum type vehicle that allows an inclination sensor that is required for the inverted pendulum control of the vehicle to be placed on or adjacent to the gravitation center of the vehicle.

A third object of the present invention is to provide an inverted pendulum type vehicle that allows an electric unit to be placed favorably so that the vehicle may be designed in a highly compact manner, and the accessibility of the electric unit for maintenance purposes may be ensured.

A fourth object of the present invention is to provide an inverted pendulum type vehicle that allows the amount of wiring to be minimized for an improved accessibility for maintenance and compact design.

According to the present invention, such objects can be accomplished by providing an inverted pendulum type vehicle having a lower frame and an upper frame detachably joined to an upper end of the lower frame, the lower and upper frames each defining a hollow interior, comprising: a drive unit incorporated in the lower frame; and a battery unit received in the upper frame and configured to supply electric power to the drive unit.

Thus, the two major parts, in terms of weight and bulk, are provided in an upper part and a lower part of the vehicle, respective, a compact and small foot print design can be accomplished. In particular, if an electric unit for controlling supply of electric power from the battery unit to the drive unit is supported by at least one of the upper and lower frames and located in a part substantially intermediate between the e battery unit and drive unit, the compact design of the vehicle can be even more enhanced.

According to a preferred embodiment, the drive unit comprises an annular main wheel, an electric motor for rotatively actuating the main wheel and a drive assembly for transmitting an output power of the electric motor to the main wheel. In this arrangement, the lateral width of the vehicle can be reduced while the fore and aft dimension of the vehicle is relatively large so that the compact design and favorable handling can be accomplished at the same time.

The seat normally inevitably protrudes from the profile of the vehicle during use, and it is desirable that the seat can be retracted into the profile of the vehicle for the convenience of storage, transportation and parking. Therefore, the upper frame may be provided with an annular shape defining a hollow interior and a central opening, the hollow interior receiving the battery unit therein, and the central opening configured to store a retractable seat assembly of a vehicle occupant when the seat assembly in a retracted state.

According to a certain aspect of the present invention, the electric unit is provided with an inverted pendulum control unit, and an inclination sensor for providing inclination angle data to the inverted pendulum control unit is supported by at least one of the upper and lower frames and located in a part substantially intermediate between the battery unit and the drive unit. By thus placing the inclination sensor, typically consisting of a gyro sensor, the acceleration (the tilting angle) of the vehicle can be detected at a high accuracy, and this improves the control response of the vehicle.

If the upper frame is provided with a load supporting member, such as a support for cargo or a seat for supporting buttocks of a vehicle occupant, the weight of the lower part including the drive unit which accounts for a large part of the weight of the vehicle can be relatively easily balanced with the weight of the upper part of the vehicle. This also helps the inclination sensor to be placed adjacent to the gravitational center of the vehicle. When the upper part of the vehicle is provided with a seat, a pair of steps for supporting feet of the vehicle occupant may be conveniently provided in the lower part of the vehicle.

According to a preferred embodiment of the present invention, an electric unit for controlling supply of electric power from the batter to the drive unit is supported by at least one of the upper and lower frames and located in a part substantially intermediate between the battery unit and the drive unit and a load sensor provided in the electric unit for detecting a load acting upon the load supporting member and transmitted thereto via at least a part of the upper frame.

This arrangement improves the accessibility of the electric unit for maintenance purposes. Typically, the electric unit comprises an inclination sensor for detecting an inclination angle thereof with respect to a vertical plumb line, a motor driver circuit board for controlling an electric motor of the drive unit, and a power source circuit board for supplying electric power to the drive unit. Also, by providing the load sensor for detecting the load on the vehicle in the electric unit, the wiring of the load sensor to the control circuit and other parts of the electric unit can be simplified and minimized, and this also contributes to the compact design of the vehicle and improved accessibility of the electric unit.

If the electric unit further comprises a cooling air blower fan, and, in particular, the motor driver circuit board defines an at least a part of a cooling air passage of the cooling air blower fan, heat from various components can be efficiently removed, and this contributes to a compact design of the vehicle. To further enhance the cooling efficiency, at least one of the upper and lower frames may be provided with a vent opening corresponding in position to a cooling passage of the cooling air blower fan.

The electric unit may further comprise a control circuit board for controlling motion of the vehicle at least according an output of the inclination sensor, and the inclination sensor and power source circuit board are located one above the other while the control circuit board extends vertically on a side of the inclination sensor and power source circuit board between the inclination sensor and power source circuit board. Thereby, the accessibility of the various circuit boards can be ensured, and the amount of wiring that is required for connecting the various circuit boards can be minimized. Furthermore, the cooling efficiency of the circuit boards can be enhanced. In particular, the power source circuit board preferably extends substantially horizontally.

If a power line electrically connecting the battery unit in the upper frame with the power source circuit board extends on the other side of the inclination sensor and power source circuit board opposite from the control circuit board, the wiring between the battery unit and power source circuit board can be optimized in terms of the amount of the wiring and space utilization.

According to a particularly preferred embodiment of the present invention, the electric unit is mounted on the lower frame, and is provided with a connector configured to be electrically connected to a corresponding connector provided on the upper frame, the lower and upper frames are provided with complementary guide members that allow the connectors to be connected to each other when the upper and lower frames are physically joined to each other. Thereby, the upper frame and lower frame can be readily separated from each other and joined together as required. If desired, the upper frame may be separately stored and recharged so that the upper frame may be interchangeably used with different frames.

BRIEF DESCRIPTION OF THE DRAWINGS

Now the present invention is described in the following with reference to the appended drawings, in which:

FIGS. 11a and 11b are perspective views of the inverted pendulum type vehicle in two different vehicle occupant situations, with the seat assembly deployed for a vehicle occupant to sit thereon and with the seat assembly retracted so that the vehicle occupant may ride the vehicle in a standing posture, respectively.

DETAILED DESCRIPTION OF THE PREFERRED EMBODIMENTS

Figure 1:
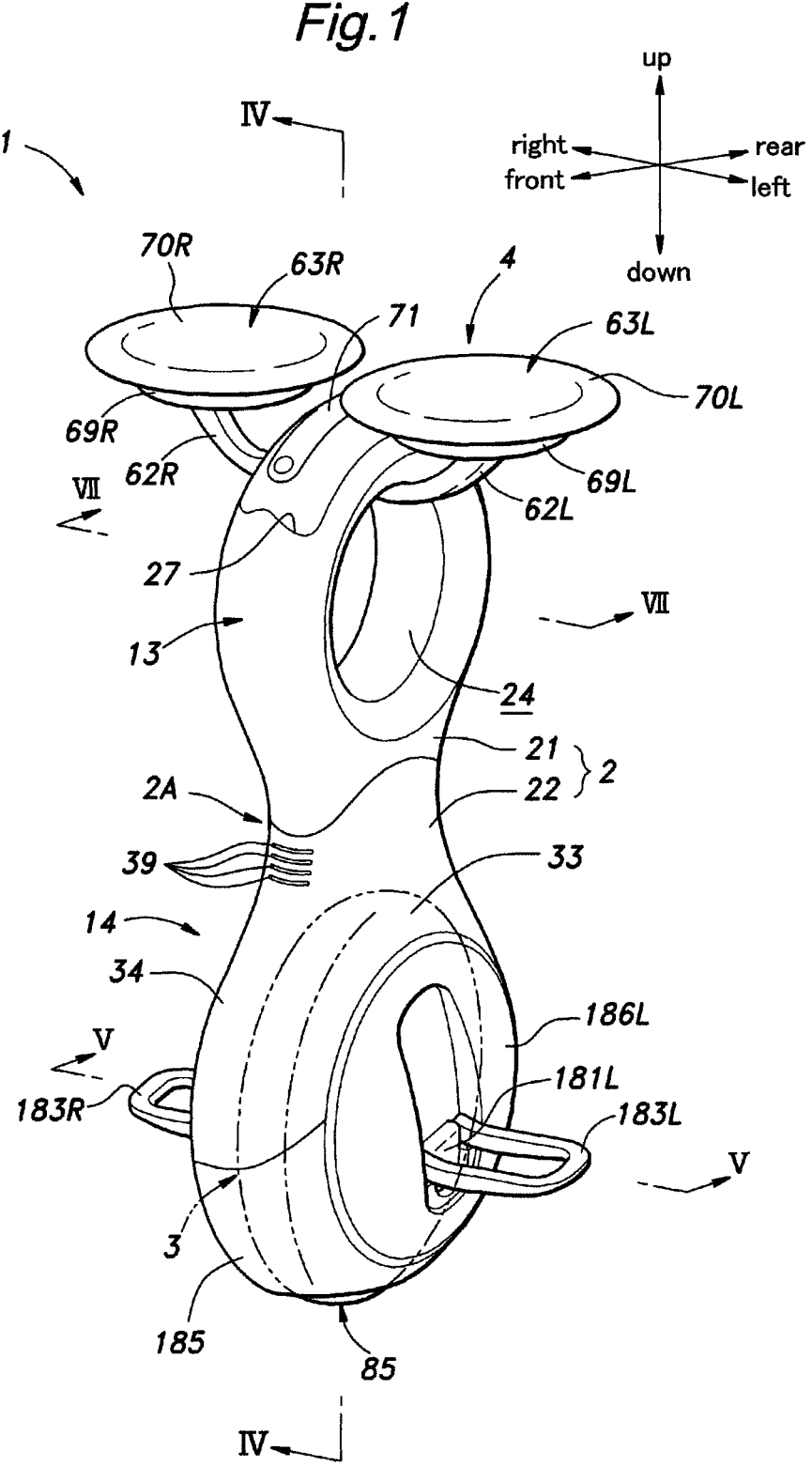
FIG. 1 is a perspective view of an inverted pendulum type vehicle embodying the present invention with a seat assembly deployed for a vehicle occupant to sit thereon and steps deployed for the feet of the vehicle occupant to rest thereon.

The vehicle according to the present invention is in large part symmetric with respect to a central longitudinal plane, and various components are used in pairs, one on the right hand side and the other on the left hand side. Such components are denoted with numerals with a suffix L or R, L indicating the component being on the left hand side and R indicating the component being on the right hand side. Therefore, only one of each of such pairs may be described in the following by denoting the component with a numeral without a suffix, instead of repeating the same description with respect to the other of the pair. These numerals are also used without the suffix in the following description to denote such components collectively.

Referring to FIGS. 1, 3, 4 and 5, the inverted pendulum type vehicle 1 given as a first embodiment of the present invention comprises a frame 2 elongated in a vertical direction, a drive unit 3 incorporated in a lower part of the frame 2, a seat assembly 4 incorporated in an upper part of the frame 2, an electric unit 11 received in an inner middle part of the frame 2 and a battery unit 10 received in an upper part of the frame 2 to power the drive unit 3 and electric unit 11 as well as various sensors. The electric unit 11 comprises an inverted pendulum control unit 5, an upper load sensor 6 and an inclination sensor 7. The control unit 5 controls the drive unit 3 according to the principle of the inverted pendulum control based on output signals received from various sensors so as to maintain the vehicle 1 in an upright posture. The sensors include a pair of step load sensors 8 and rotary encoders 9.

Figure 3:
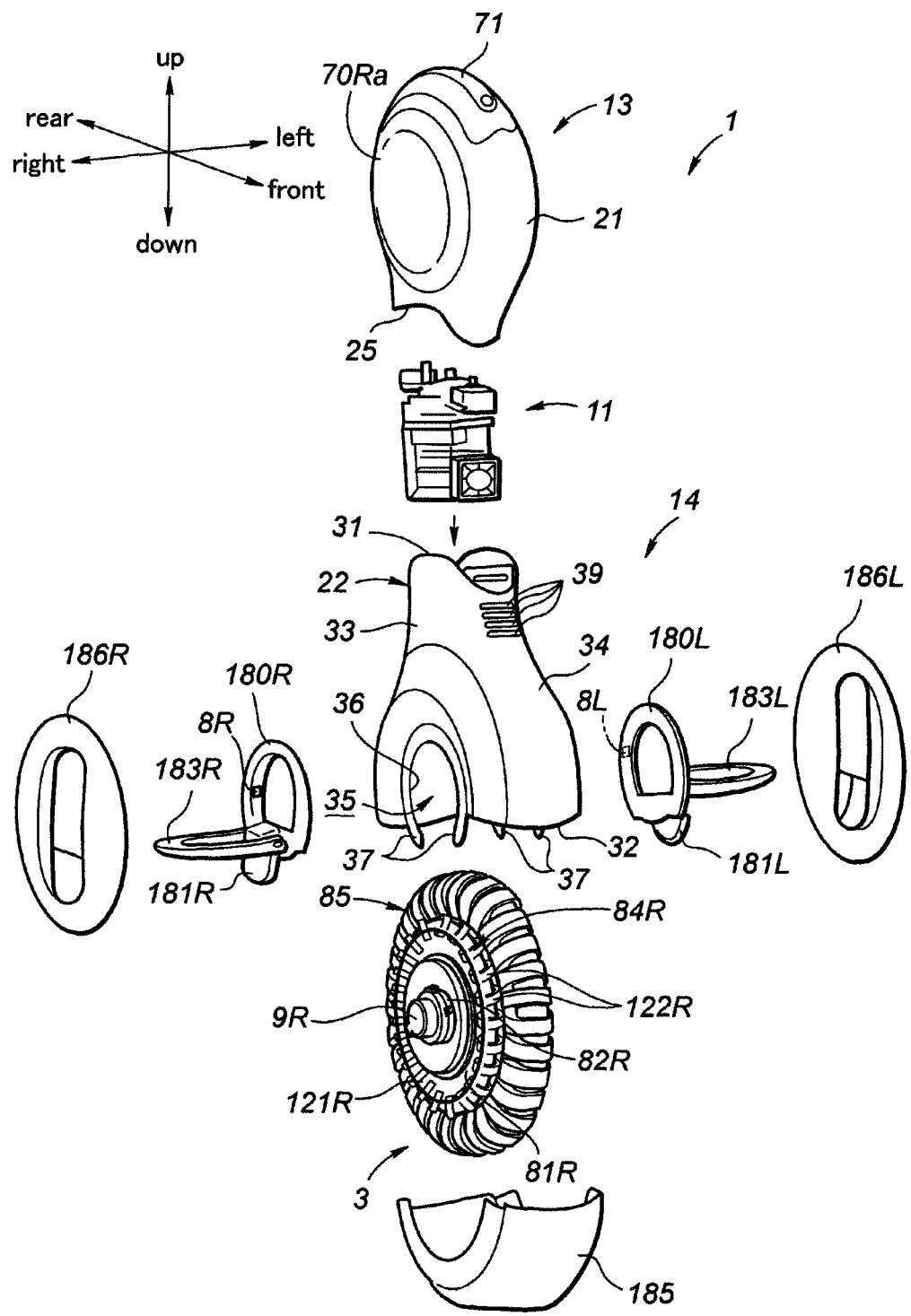
FIG. 3 is an exploded perspective view of the vehicle.

Referring to FIG. 1, the frame 2 is formed as a hollow shell, and have a substantially greater fore and aft dimension than a lateral dimension as seen in a horizontal cross section. The frame 2 includes a narrow section 2A which is narrow as seen from a side, or has a side profile in the shape of numeral "8". The frame 2 is divided into an upper frame 21 and a lower frame 22 at the narrow section 2A as best illustrated in FIG. 3. Each of the upper and lower frames 21 and 22 is made of dry carbon (carbon fiber reinforced plastic material) which is formed by thermally curing carbon pre-impregnated sheets. The upper frame 21 and lower frame 22 are joined to each other via the upper load sensor 6 which will be described hereinafter.

Figure 4:
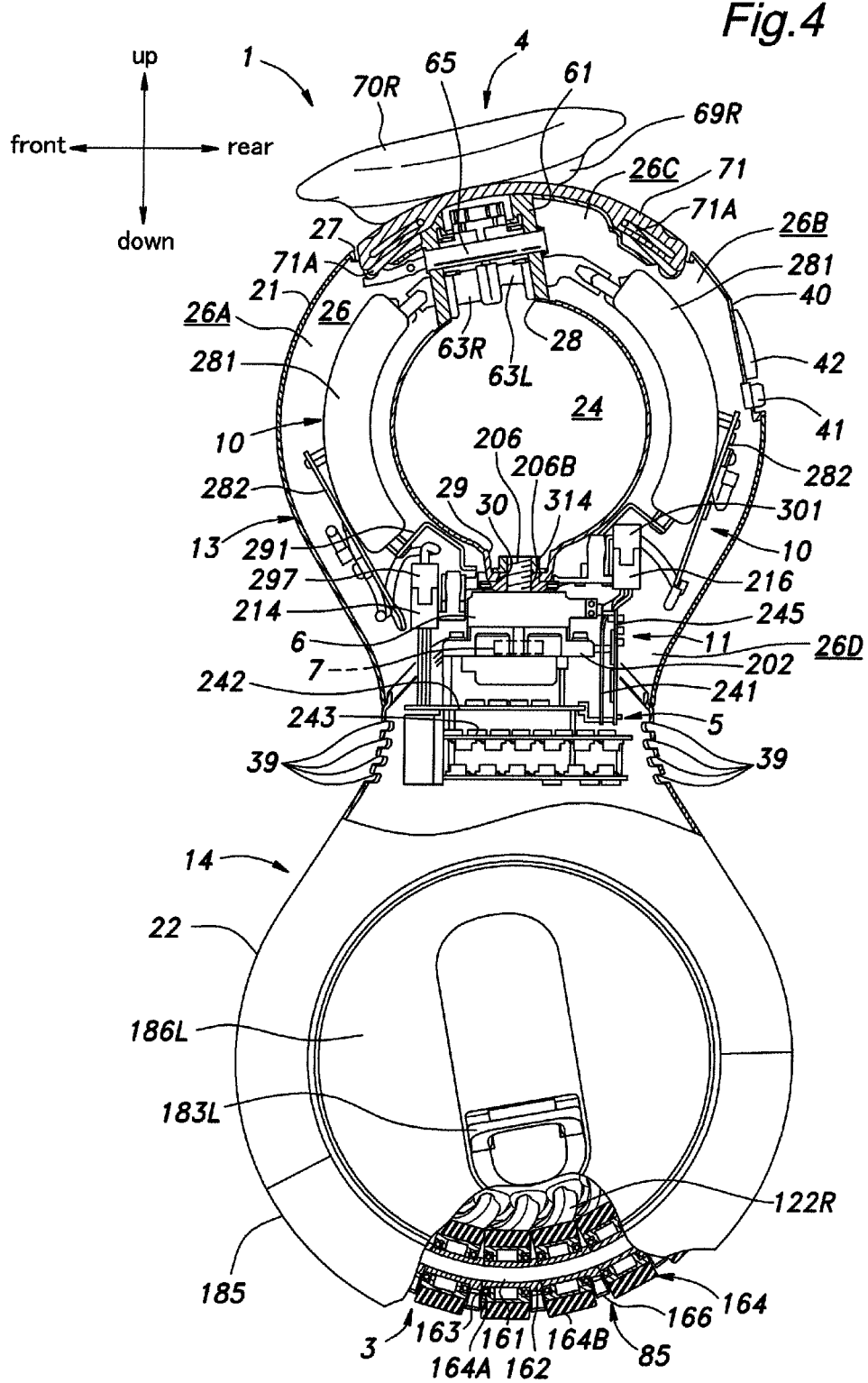
FIG. 4 is a side view of the vehicle mostly in section taken along line IV-IV of FIG. 1.

As shown in FIG. 4, the upper frame 21 is given with an annular shape so as to define a central space or a saddle storage space 24 passed laterally across the upper frame 21. The hollow interior of the upper frame 21 includes a front space 26A, a rear space 26B, an upper space 26C, and a lower space 26D. The lower end of the upper frame 21 is formed with a lower opening 25 (FIG. 3) facing downward. The upper end of the upper frame 21 is formed with an upper opening 27 communicating the upper space 26C with the exterior of the upper frame 21. The wall of the upper frame 21 separating the upper space 26C from the saddle storage space 24 is formed with a saddle mounting hole 28. The wall of the upper frame 21 separating the lower space 26D from the saddle storage space 24 is formed with a recess 29 which is recessed downward, and a connecting hole 30 is formed centrally in the bottom wall of the recess 29.

Figure 2:
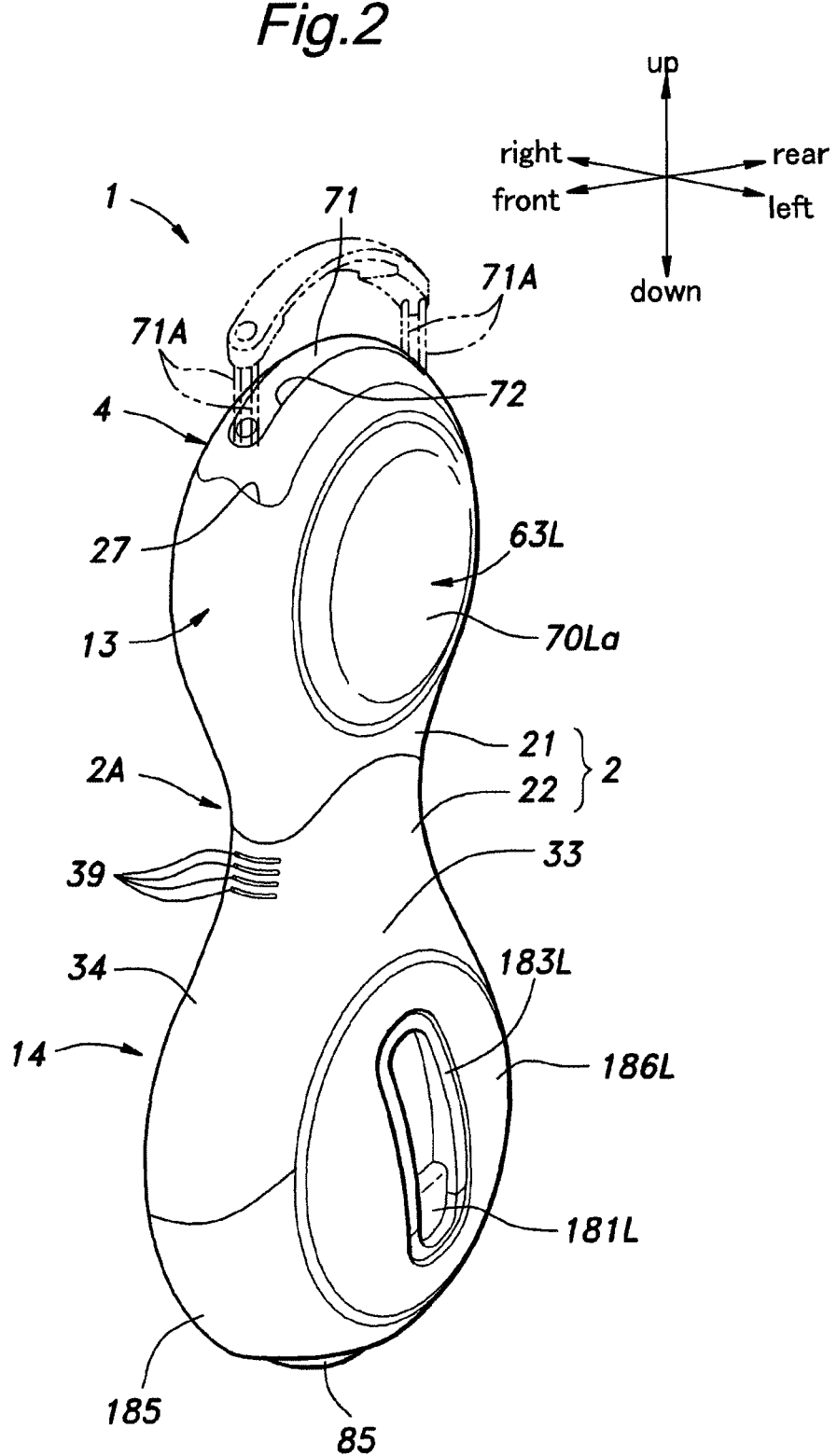
FIG. 2 is a view similar to FIG. 1 showing the vehicle ready to be transported with the seat assembly and steps retracted.

The upper frame 21 thus defines an annular interior, and the battery unit 10 includes a rechargeable battery 281 consisting of a pair of arcuate parts, one received in the front space 26A and the other in the rear space 26B so as to conform to the arcuate form of the corresponding spaces. The seat assembly 4 is received in the saddle storage space 24 passed laterally across the upper frame 21 when retracted as illustrated in FIG. 2. Therefore, the annular shape of the upper frame 21 is conveniently utilized for storing the seat assembly 4 and battery unit 10 in a highly compact manner.

As shown in FIG. 4, to a rear side of the upper frame 21 is secured a switch panel 40 which includes a power switch 41 to turn on and off the main power of the vehicle 1 and a power lamp 42 that lights up when the main power is turned on.

Figure 6:
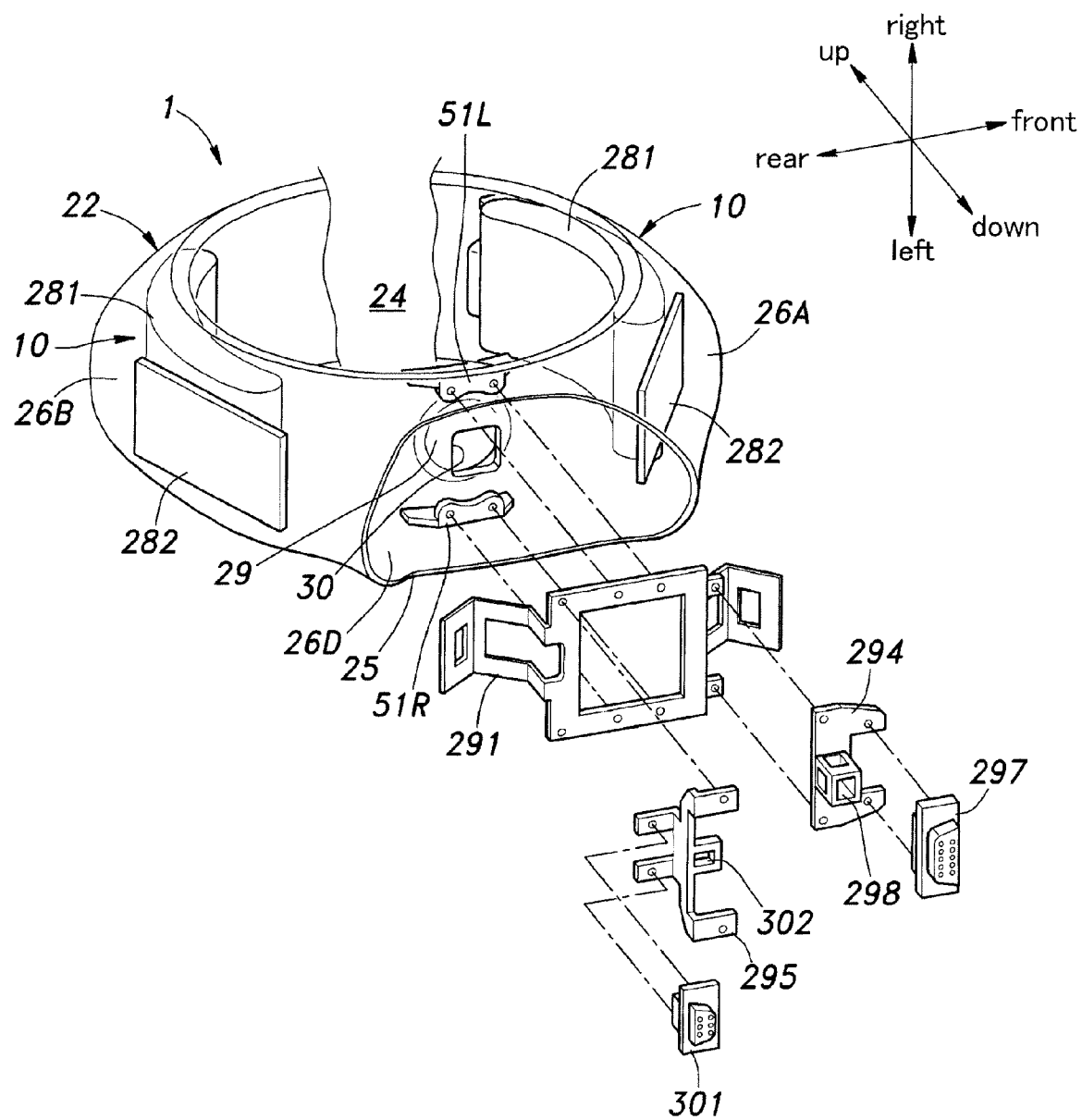
FIG. 6 is an exploded perspective view of an upper structure of the vehicle.

As shown in FIG. 6, to the inner surface of the upper wall of the lower inner space 26D are attached a pair of metallic support bases 51 on either lateral side of the recess 29. Each support base 51 is provided with a horizontal plate section extending in the fore and aft direction, and a pair of threaded holes are formed vertically in the horizontal plate section one behind the other.

As shown in FIG. 3, the lower frame 22 is also made of a hollow shell having an upper opening 31 and a lower opening 32. The lower frame 22 includes a pair of side walls 33 extending vertically in mutually parallel relationship, and is generally elongated in the fore and aft direction. The front and rear walls 34 bulge in forward and rearward directions, respectively, adjacent to lower parts thereof so that a lower part of the lower frame 22 presents a substantially semi-circular side profile. The lower part of the lower frame 22 defines a receiving space 35 for receiving an upper half of the drive unit 3.

The lower edge of each side wall 33 of the upper frame is provided with a semi-circular cutout 36 substantially concentric to the semi-circular side profile of the lower frame 22. The semi-circular cutouts 36 of the two side walls 33 are conformal and coaxial to each other. Each semi-circular cutout 36 is flanked by a pair of tongue pieces 37 depending therefrom as seen in a side view. The upper part of each of the front and rear walls 34, adjacent to the narrow section 2A of the frame 2, is formed with vent openings 39 which, in this case, consist of a plurality of laterally elongated holes arranged vertically in mutually parallel relationship.

In the vehicle 1 of the illustrated embodiment, because the drive unit 3 and battery unit 10 are arranged in the lower frame 22 and upper frame 21, respectively, the vehicle 1 may be given with a vertically slender configuration having a small foot print. Furthermore, because the electric unit 11 is placed between the drive unit 3 and battery unit 10 or in the narrow section 2A, the vehicle 1 is given with a highly compact profile.

Figure 8:
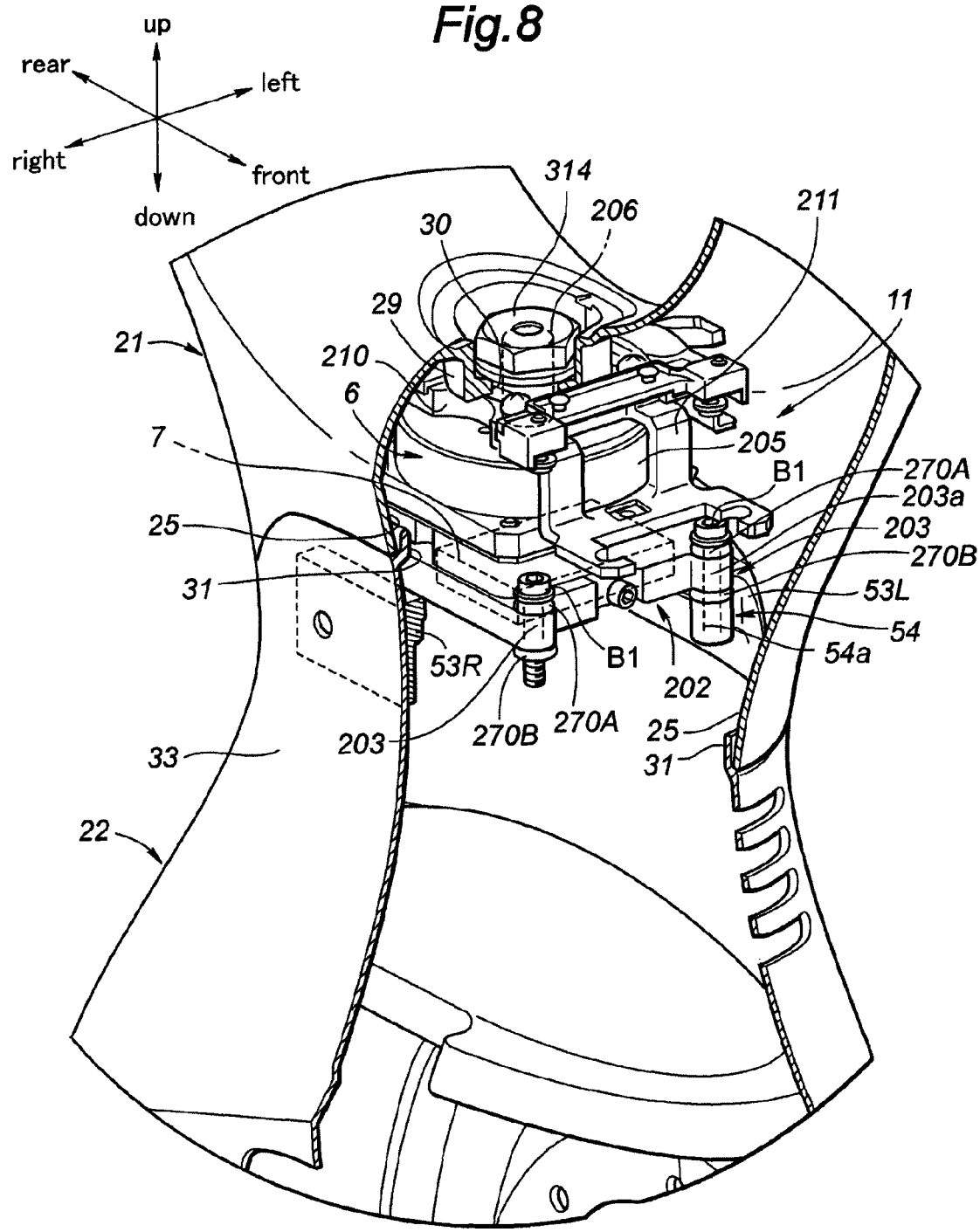
FIG. 8 is a fragmentary partly broken away perspective view of a narrow section of the vehicle.

Referring to FIG. 4, the upper frame 21 forms an upper structure 13 in cooperation with the seat assembly 4 and battery unit 10, and the lower frame 22 forms a lower structure 14 in cooperation with the drive unit 3, electric unit 11 and sensors 8 and 9 (FIGS. 3 and 8). The upper structure 13 can be separated from the lower structure 14 when necessary.

Figure 7:
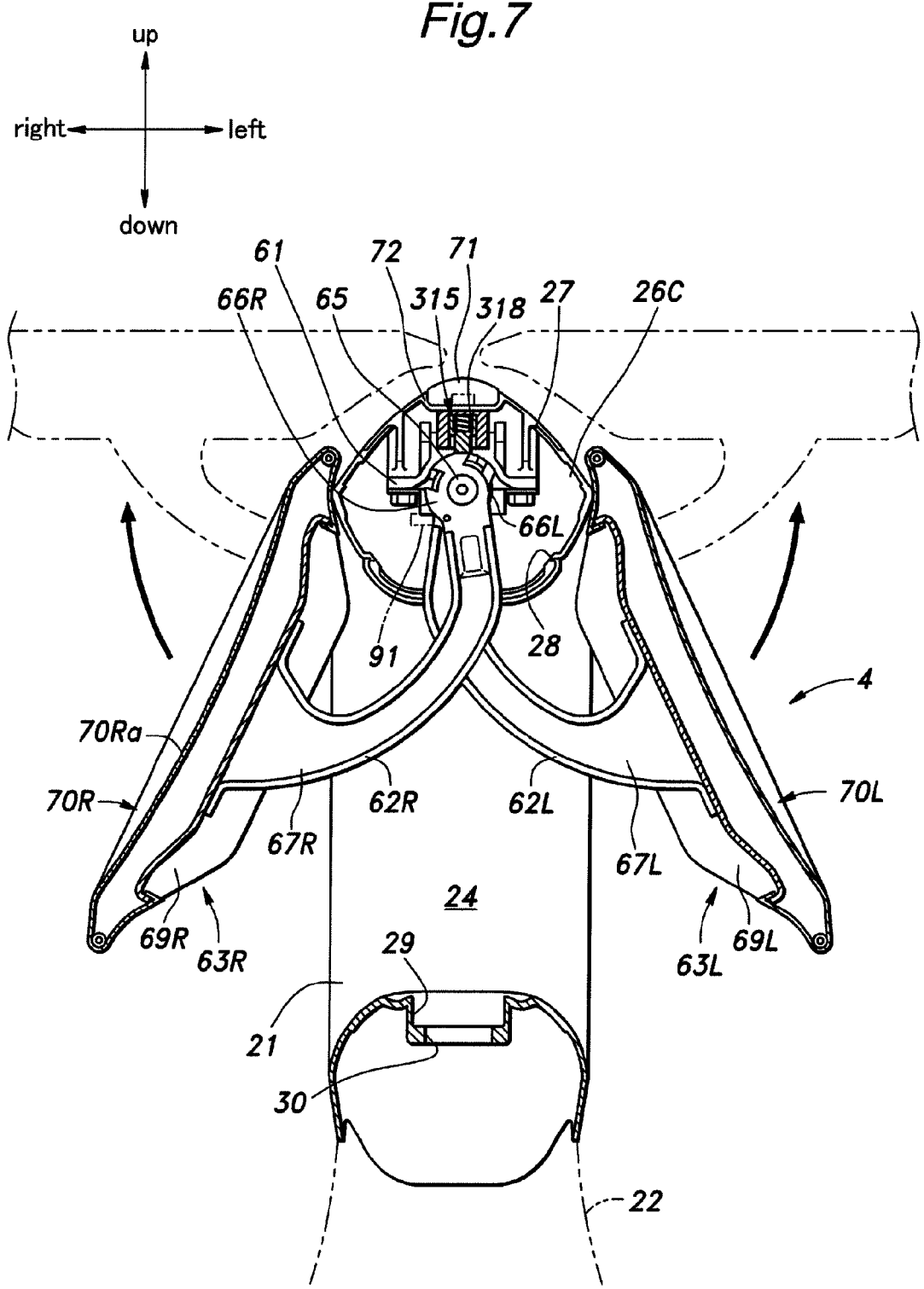
FIG. 7 is a sectional view taken along line VIII-VIII of FIG. 1.

Referring to FIG. 7, the seat assembly 4 includes a base main body 61, a pair of saddle arms 62 and a pair of saddle members 63. The base main body 61 is installed in the upper space 26C from the upper opening 27, and an upper wall of the base main body 61 closes the upper opening 27. An upper part of the base main body 61 is provided with a support shaft 65 extending in the fore and aft direction.

The support shaft 65 pivotally supports the base ends 66 of the saddle arms 62. Each saddle arm 62 extends from the base end 66 thereof, and is passed through the saddle mounting hole 28. The free end 67 of each saddle arm 62 is therefore located outside of the upper frame 21. The left saddle arm 62L is rotatable between a retracted position in which the free end 67L thereof is located below the base end 66L thereof or within the saddle storage space 24 and a deployed position (service position) located to the left of the base end 66L thereof. Similarly, the right saddle arm 62R is rotatable between a retracted position in which the free end 67R thereof is located below the base end 67R thereof or within the saddle storage space 24 and a deployed position (service position) located to the right of the base end 66R thereof. Each saddle arm 62 is curved so that the convex side thereof faces downward in the deployed position thereof.

The saddle arms 62 are connected to each other via a link mechanism not shown in the drawings so that one of them may be retracted when the other one is retracted, and deployed when the other one is deployed in unison. The base main body 61 is provided with a lock member (not shown in the drawings) which is selectively engaged by an engagement hole provided in each of the saddle arms 62 so that the saddle arms 62 may be fixed at each of the retracted position and deployed position as required.

The free end 67 of each saddle arm 62 is fitted with a saddle member 63 that includes a support portion 69 by which the saddle member 63 is connected to the saddle arm 62 and a disk shaped cushion pad 70 supported by the support portion 69. Each cushion pad 70 defines a seat surface 70a, on a side thereof opposite from the support portion 69, for supporting a buttock of a vehicle occupant. When the saddle arms 62 are in the deployed position as indicated by the double-dot chain-dot line in FIG. 7, the cushion pad 70 is placed above the support portion 69, and defines an upwardly directed seat surface. The load of the vehicle occupant D in the sitting posture (see FIG. 11a) is applied to the upper frame 21 via the saddle member 63, saddle arm 62 and base main body 61.

When the saddle arms 62 are in the retracted position, the support portions 69 of the saddle members 63 are received within the saddle storage space 24 and the cushion pads 70 close the respective sides of the saddle storage space 24 so that the upper frame 21 presents a smooth side contour.

The structure of the seat assembly 4 for the vehicle 1 is not limited to the one used in the illustrated embodiment, but may also be given with different configurations, for instance for supporting a cargo. In such a case, the shape of the saddle 63 may be modified to suit the particular cargo to be transported by the vehicle 1.

The upper wall of the base main body 61 is fitted with a retractable grip handle 71 that can be used for lifting and carrying the vehicle 1 by the user, much like a grip handle of a suitcase. When not in use, the grip handle 71 may be received in a handle receiving recess 72 formed in the upper wall of the base main body 61 as indicated by the solid lines in FIG. 2. When in use, the grip handle 71 is raised above the base main body 61, and connected to the base main body 61 via a pair of legs 71A as indicated by the imaginary lines in FIG. 2. Each leg 71A includes a base end pivotally connected to the base main body 61 and a free end pivotally connected to the grip handle 72 via a slot formed in the grip handle 71. Therefore, when the vehicle is powered off, the user can lift and carry the vehicle 1 or maintain the vehicle in the upright posture by holding the grip handle 71.

Figure 5:
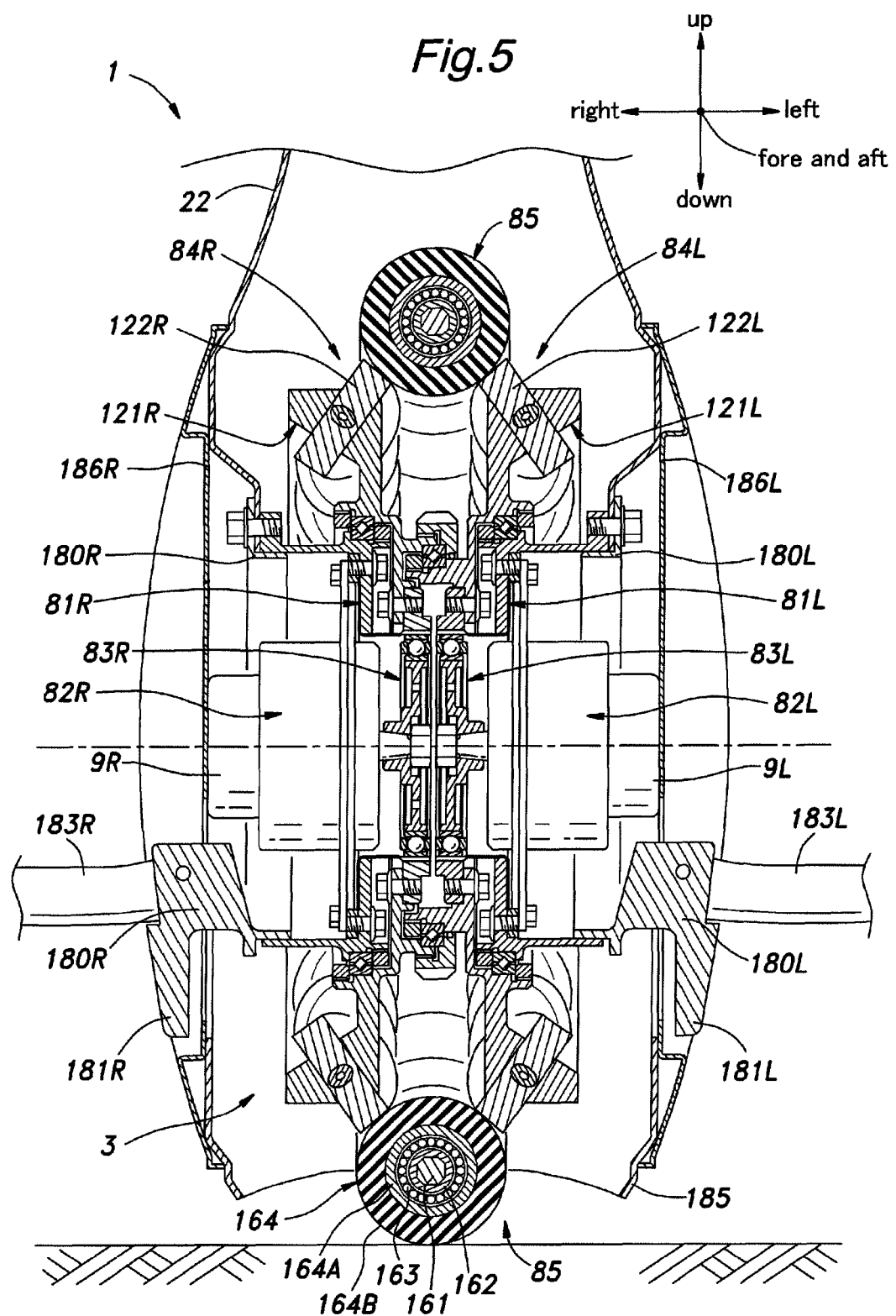
FIG. 5 is a sectional view taken along line V-V of FIG. 1.

As shown in FIGS. 3 to 5, the drive unit 3 comprises a pair of symmetrically opposing drive assemblies 84 each comprising a mount member 81 fixedly attached to the lower frame 22, an electric motor 82 mounted on the mount member 81, a wave gear device 83 for reducing the rotational speed of the output shaft of the motor 82, and a drive disk 121 rotatively actuated by the electric motor 82 via the wave gear device 83. Thus, the rotational output of the electric motor 82 is transmitted to the drive disk 121 at a reduced speed. The drive unit 3 further comprises a main wheel 85 interposed between the two drive assemblies 84, and rotatively actuated by the two drive assemblies 84.

As shown in FIG. 5, each mount member 81 consists of a cylindrical member having an axial line thereof directed laterally, and is provided with a radial internal flange on an inner axial end thereof and a radial external flange on an outer axial end thereof. The mount member 81 receives the corresponding electric motor 82 therein, and the output shaft thereof extends inwardly through a central opening of the radial internal flange. As the electric motor 82 is substantially coaxially received in the hollow interior of the cylindrical portion of the mount member 81, the drive unit 3 can be given with a highly compact and slim profile, and this in turn allows the lower frame 22 to have a highly compact outer profile.

As shown in FIG. 5, each drive assembly 84 further comprises a plurality of drive rollers 122 rotatably supported by the drive disk 121. The drive rollers 122 are arranged along the periphery of the corresponding drive disk 121 at a regular interval, and are rotatably supported by respective roller shafts such that the planes of rotation are each disposed neither in parallel to nor perpendicular to the axial center line (center of rotation) of the drive disk 121. The positional relationship of the drive rollers 122 on the drive disk 121 may be similar to the gear teeth of a helical bevel gear of a prescribed cone angle. For more detailed description of the drive unit, see WO2008/139740A (US20100096905A1). The roller shafts are positioned such that the outer periphery of each drive roller 122 is located radially more outward than the outer periphery of the drive disk 121.

The main wheel 85 comprises an annular member 161 made of a ring having a polygonal cross section, a plurality of inner sleeves 162 fixedly fitted on the annular member 161 at a regular interval and a driven roller 164 rotatable supported by the outer circumferential surface of each sleeve 162 via a ball bearing 163. The driven rollers 164 are configured to engage a floor surface, and may each consist of a metal cylinder 164A fitted on the outer race of the ball bearing 163 and a rubber cylinder 164B integrally vulcanized onto the outer circumferential surface of the metal cylinder 164A.

The driven rollers 164 along with the associated inner sleeves 162 are arranged circumferentially along the entire circumference of the annular member 161, and the driven rollers 164 are each freely rotatable around the axial line thereof which is tangential to the corresponding position of the annular member 162. A disk shaped cover 166 (see FIG. 4) is interposed between each adjacent pair of driven rollers 164 so as to close the wedge shaped gap between the adjacent driven rollers 164 and thereby keep foreign matter from intruding into the ball bearings 163.

The inner diameter of the main wheel 85 is smaller than the outer diameter of each drive assembly 84. The outer diameter of the main wheel 85 is larger than the outer diameter of the drive assemblies 84. The inner and outer diameters of the main wheel 85 and each drive assembly 84 are defined by the corresponding envelopes of the drive rollers 122 and driven rollers 164, respectively. The main wheel 85 is thus interposed between the drive rollers 122 of the two drive assemblies 84L and 84R.

The drive rollers 122L and 122R frictionally engage the rubber cylinders 164B of the driven rollers 164 at their respective circumferential surfaces so that the rotation (or torque) of the drive rollers 122L and 122R can be transmitted to the driven rollers 164.

In the illustrated embodiment, the mode of rotation of the main wheel 85 and rotation of the driven rollers 164 is determined by the modes of rotation of the two drive disks 121L and 121R. When the two drive disks 121L and 121R are rotated at a same speed in a same direction, the main wheel 85 rotates circumferentially or around the central axial line while the driven rollers 164 do not rotate around the respective axial lines so that the vehicle travels either in the forward or rearward direction depending on the rotational direction of the drive disks 121L and 121R.

When the two drive disks 121L and 121R are rotated at a same speed in opposite directions, the main wheel 85 remains stationary while the driven rollers 164 rotate around the respective axial lines so that the vehicle travels sideways depending on the rotational directions of the drive disks 121L and 121R.

When the two drive disks 121L and 121R are rotated at mutually different speeds, the main wheel 85 is rotated around the central axial line A at a speed corresponding to the average of the rotational speeds of the two drive disks 121L and 121R, and the drive rollers 164 are rotated around their respective axial lines at a speed corresponding to the difference between the rotational speeds of the two drive disks 121L and 121R.

Therefore, by suitably selecting the rotational speeds of the two drive disks 121L and 121R, the vehicle 1 is allowed to travel in any desired direction given as a composition of a fore-and-aft movement and a lateral movement.

The arrangement for attaching the drive unit 3 to the lower frame 22 is described in the following. As shown in FIG. 3, the upper half of the drive unit 3 is received in the receiving space 35 of the lower frame 22 such that the axial line thereof is directed laterally with respect to the frame 2. As shown in FIG. 5, the radial external flange of each mount member 81 of the drive unit 3 engages the peripheral edge of the cutout 36 in the side wall of the lower frame 22 and the inner surface of the tongue piece 37.

As shown in FIG. 3, a step base 180 is attached to the outer surface of each side wall 33 of the lower frame 22. The step base 180 consists of a metallic annular member having an outer profile conforming to those of the cutout 36 and tongue piece 37. The radial external flange of each mount member 81 is formed with threaded holes, and corresponding through holes are formed in the peripheral part of the cutout 36 and tongue piece 37 so that the peripheral part of the cutout 36 and tongue piece 37 are firmly interposed between the step base 180 and radial external flange by passing threaded bolts into the through holes and threading them into the threaded holes of the radial external flange of each mount member 81. Thus, the two step bases 180 and the drive unit 3 are jointly attached to the lower frame 22.

As shown in FIG. 5, the lower part of the step base 180 is provided with an axial flange that is passed into the space defined between the two tongue pieces 37, and closely received by the inner circumferential surface of the mount member 81. The step base 180 is provided with a lower extension 181 having a base end including an upper part extending axially outward and a lower part generally depending therefrom. The base end of the lower extension 181 rotatably supports a base end of a step 183 via a pivot shaft extending in the fore and aft direction. The step 183 is rotatable between a retracted position extending upward along a side of the lower frame 22 and a deployed position extending laterally outward.

As shown in FIG. 3, a step load sensor 8 is attached to an outer surface of the step base 180. The load sensor 8 may consist of a per se know strain gauge configured to detect strain in the step base 180 when the step 183 is subjected to an external load typically consisting of a load applied by a foot of the vehicle occupant.

As shown in FIGS. 1 to 5, the lower end of the lower frame 22 is provided with a lower cover 185 which conceals the lower half of the drive unit 3 except for the ground contact area of the main wheel 85. To an outer side of each side wall 33 of the lower frame 22 is attached a side cover 186 which conceals the step base 180, but is provided with an opening to allow the step 183 to extend laterally and be raised upward and the lower extension 181 to be externally exposed.

Figure 9:
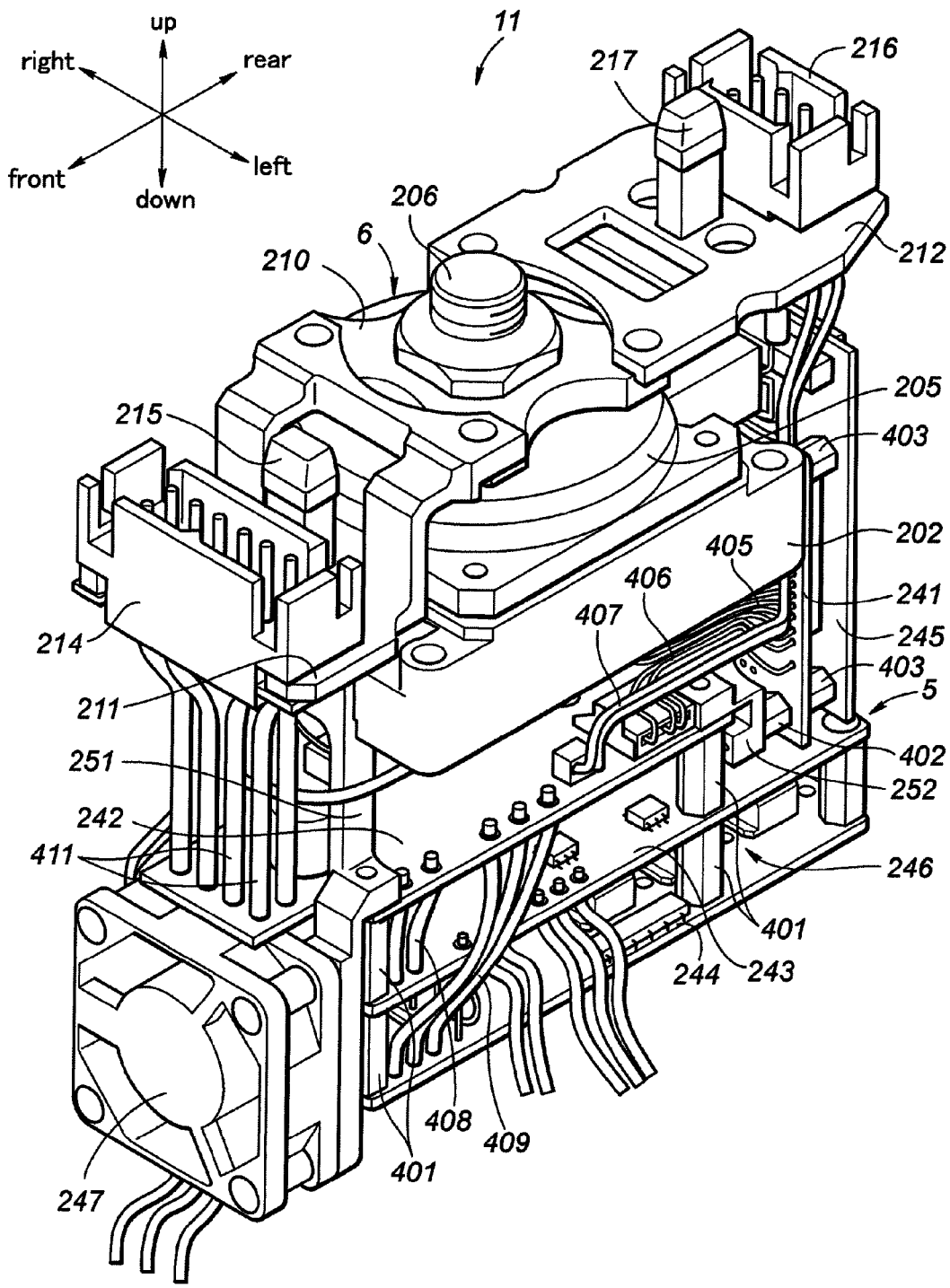
FIG. 9 is a perspective view of an electric unit of the vehicle.

Referring to FIGS. 8 and 9, the various components of the electric unit 11 such as the control unit 5, upper load sensor 6 and inclination sensor 7 are fixedly attached to an electric mount frame 202.

A shown in FIG. 8, to the inner surface of an upper end of each side wall 33, adjacent to the upper opening 31, is fixedly attached a metallic support base 53 which includes a horizontal plate section extending in the fore and aft direction, and a pair of threaded holes 54*a* are formed in the support portions 54 provided in the horizontal plate section one behind the other.

The electric mount frame 202 essentially consists of a rectangular planar member defining a rectangular central opening, and rests upon the support bases 53 along the side edges thereof. Each side edge of the electric mount frame 202 is provided with a pair of mounting portions 203 formed with through holes 203*a* so as to correspond to the threaded holes 54*a* of the support bases 53.

The upper load sensor 6 consists of a tri-axial force sensor that can detect moments around the z-axis (vertical direction), x-axis (for and aft direction) and y-axis (lateral direction), and includes a body portion 205 receiving a sensor circuit board (not shown in the drawings) and fixedly attached to the upper surface of the electric mount frame 202 by threaded bolts, and an input shaft 206 extending upward from the body portion 205 and formed with a male thread along the length thereof.

As illustrated in FIGS. 4, 8 and 9, the body portion 205 is mounted on the electric mount frame 202, and fixedly secured thereto by using threaded bolts. The output shaft 206 is threaded into a threaded central opening of a planar connecting member base 210, and a free end of the output shaft 206 projects upward from the connecting member base 210.

Referring to FIG. 9, the first connector base 211 is attached to a front part of the connecting member base 210 by using threaded bolts, and extends forward. A first connector 214 which is electrically connected to the wiring from a power source circuit board 242 (which will be described hereinafter) is secured to the first connector base 211 by using threaded bolts. The first connector base 211 is provided with a first guide pin 215 extending upward.

A second base 212 is attached to a rear part of the connecting member base 210 by using threaded bolts, and extends rearward. A second connector 216 which is electrically connected to the wiring from a control circuit board 241 (which will be described hereinafter) is secured to the second connector base 212 by using threaded bolts. The second connector base 216 is provided with a second guide pin 217 extending upward.

Referring to FIG. 8, the inclination sensor 7, which may consist of a per se known gyro sensor, is passed downward inside the electric mount frame 202, and fixedly secured thereto by using threaded bolts. The inclination sensor 7 is configured to detect an inclination angle thereof relative to a plumb vertical direction.

As shown in FIG. 9, the control unit 5 includes, in addition to the control circuit board 241 and power source circuit board 242, a left motor driver circuit board 243, a right motor driver circuit board 244, an I/O interface circuit board 245 and a blower fan 247.

The control circuit board 241 includes a control circuit 261 (FIG. 10) which is incorporated with a CPU formed by a microcomputer, and used for controlling the electric motors 82 and other components. The control circuit board 241 is mounted on a rear side of the electric mount frame 202 via a spacer so as to extend both vertically and laterally (or with the major surface thereof facing in the fore and aft direction). The lower part of the control circuit board 241 extends downward well beyond the lower side of the electric mount frame 202 or the housing of the inclination sensor 7. Thus, the length of the signal lines 405 between the control circuit board 241 and the inclination sensor 7, and the lengths of the power lines 406 and signal lines 407 between the control circuit board 241 and power circuit board 242 can be minimized, and this also contributes to the compact design.

The power source circuit board 242 includes a power control circuit (not shown in the drawings) for converting the voltage of the power supplied by the battery unit 10 to a prescribed voltage. The power source circuit board 242 extends both laterally and in the fore and aft direction (or with the major surface thereof facing vertically), and is fixedly attached thereto via a first connecting member 251 extending downward from the front end of the electric mount frame 202.

The rear end of the power source circuit board 242 is connected to the lower end of the control circuit board 241 via a second connecting member 252 and a spacer 402. Thus, the length of power lines 408 between the power source circuit board 242 and left motor drive circuit board 243, and the length of power lines 409 between the power source circuit board 242 and right motor drive circuit board 244 can be minimized, and this also contributes to the compact design.

Figure 10:
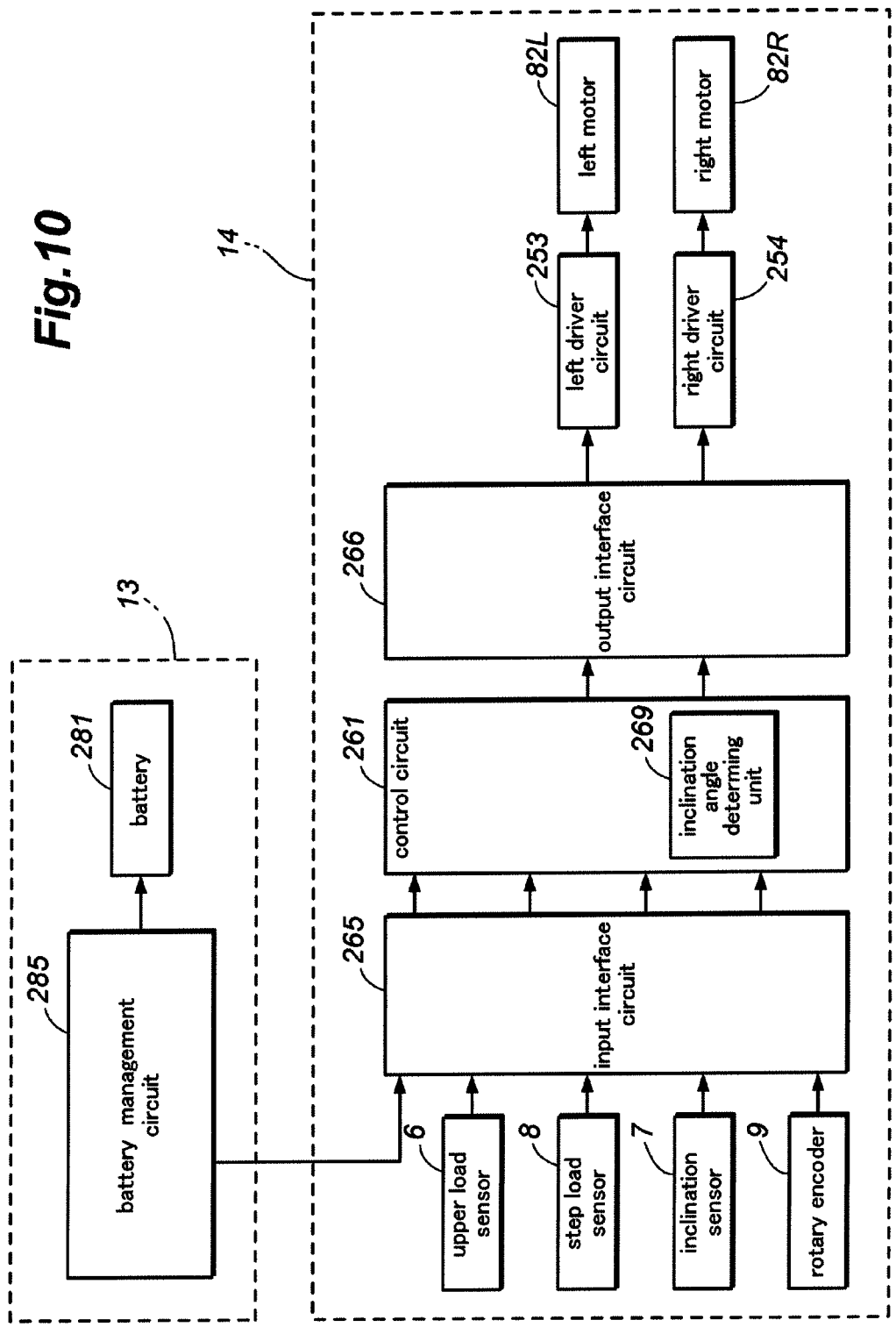
FIG. 10 is a block diagram of a control system for the vehicle.

The left motor driver circuit board 243 and right motor driver circuit board 244 include a left motor driver circuit (inverter circuit) 253 and a right motor driver circuit (inverter circuit) 254 used for the PWM control of the left and right electric motors 82L and 82R, respectively (see FIG. 10). The left motor driver circuit board 243 is fixedly attached to the electric mount frame 202 via a spacer 401 and the connecting member 252 below the power source circuit board 242 in parallel thereto. The right motor driver circuit board 244 is fixedly attached to the electric mount frame 202 via a spacer 401, the left motor driver circuit board 243 and the connecting member 252 below the left motor driver circuit board 243 in parallel thereto. Thereby, an air flow passage 246 extending in the fore and aft direction is defined between the left motor driver circuit board 243 and right motor driver circuit board 244.

The I/O interface circuit board 245 includes an input interface circuit 265 and an output interface circuit 266 (see FIG. 10), and is fixedly attached to the electric mount frame 202 via a spacer 403 behind the control circuit board 241 in parallel thereto. The I/O interface circuit board 245 extends both vertically and laterally behind the control circuit board 241 which is in turn located behind the rear end of the power source circuit board 242.

The blower fan 247 consisting of an axial flow fan is connected to the lower end of the first connecting member 251 so as to face the space or the flow passage 245 between the left motor driver circuit board 243 and right motor driver circuit board 244, and forwards an air flow into the space.

The load sensor 6, inclination sensor 7, power source circuit board 7, left motor drive circuit board 243 and right motor drive circuit board 244 are arranged one above the other, and are joined integrally to one another in the electric unit 11. This also contributes not only to the compact design but also to efficient cooling of various components. Furthermore, the electric unit 11 can be readily exposed for easy access by separating the upper and lower frames 21 and 22 from each other, and this facilitates the servicing of the vehicle 1.

The structure for securing the electric unit 11 to the lower frame 22 is described in the following. As shown in FIG. 8, each through hole 203a of the electric mount frame 202 is fitted with a rubber bush 270 consisting of two identical halves 270A and 270B each including a tubular portion received in the through hole 203 and a radial flange radially outwardly extending over the corresponding surface of the electric mounting portion 203 surrounding the through hole 203. After placing the electric mount frame 202 on the support bases 53 of the lower frame 22 via the corresponding flanges of the rubber bushes 270, threaded bolts B1 are passed into the through holes 203a (or central holes of the rubber bushes 270), and threaded into the threaded holes 54a of the support bases 53. Thus, the rubber bushes 270 insulate and protect the electric mount frame 202 from the vibrations that may otherwise be transmitted from the lower frame 22.

The electric unit 11, in its installed state, is located in the narrow section 2A connected to an upper part of the lower frame 22, and, in particular, the blower fan 247, left motor driver circuit board 243 and right motor driver circuit board 244 are located between the two sets of vent openings 39A and 39B formed in the front and rear walls 34A and 34B of the lower frame 22, respectively, so that the cooling air introduced from the front vent openings 39A is passed through the blower fan 247 and the space 246 between the left and right motor driver circuit boards 243 and 244 before being expelled from the rear vent openings 39B. Therefore, the left and right motor driver circuit boards 243 and 244 including power devices 243a and 244a which are the major sources of heat among the various components of the electric unit 11 can be efficiently cooled. Also, as the electric unit 11 is located in the narrow section 2A in an upper part of the lower frame 22, the flow path between the two sets of vent openings 39A and 39B is relatively short, and this also contributes to the efficient cooling of the electric unit 11.

As shown in FIGS. 4 and 6, the batter unit 10 includes a battery 281 consisting of two arcuate parts, one received in the front space 26A and the other in the rear space 26B, and a pair of battery management circuit boards 282. Each part of the battery 281 consists of a plurality of battery modules. The battery modules are each cylindrical in shape (not shown in the drawings), and are bundled together so as to fit in the inner space of the upper frame 21. The battery management circuit boards 282 include a battery management circuit 285 comprising a CPU formed by a microcomputer and associated memory (see FIG. 10). The battery management circuit 285 is connected to the battery 281 so as to control the charging and discharging of the battery 281, and select the battery modules that are to be used at each particular moment according to the remaining charge of the battery 281 detected by a battery charge detecting unit 286 which will be described hereinafter.

The battery management circuit boards 282 are not required to be provided on the battery parts 281, but may also be provided within the electric unit 11. However, by placing the battery management circuit boards 282 as a part of the battery unit 11 within the upper frame, the recharging of the battery parts 181 can be conveniently performed. For instance, the upper frame 21 (upper structure 13) may be recharged and stored so as to be interchangeable used for different lower frames 22 (lower structures 14).

The two parts of the battery 281 of the battery unit 10 are passed into the front space 26A and rear space 26B, respectively, from the lower opening 25 of the upper frame 21, and is supported from below by a battery bracket 291 which is in turn secured to the support bases 51 of the upper frame 21 by using threaded bolts. By thus distributing the weight of the battery unit 10 between the front and rear parts of the upper frame 21, the gravitational center of the upper frame 21 is prevented from offsetting in the fore and aft direction, and this simplifies the inverted pendulum control of the vehicle 1 and the transportation of the vehicle 1 by using the grip handle 71.

Referring to FIG. 6, the third connector base 294 is fixedly attached to the front end of the battery bracket 291 by using threaded bolts, and extends forward therefrom. A fourth connector base 295 is fixedly attached to the rear end of the battery bracket 291 by using threaded bolts, and extends rearward therefrom.

A third connector 297 is secured to the third connector base 294 by using threaded bolts, and is electrically connected to the wiring extending from the battery management circuit boards 282. The third connector 297 is complementary to the first connector 214 so as to be connected thereto, and is provided with a first guide hole 298 extending in the vertical direction and configured to receive the first guide pin 215 of the first connector base 211.

A fourth connector 301 is secured to the fourth connector base 295 by using threaded bolts, and is electrically connected to the wiring extending from the switch panel 40. The fourth connector 301 is complementary to the second connector 216 so as to be connected thereto, and is provided with a second guide hole 302 extending in the vertical direction and configured to receive the second guide pin 217 of the second connector base 212.

The structure for connecting the upper structure 13 including the upper frame 21, seat assembly 4 and battery unit 10 to the lower structure 14 including the lower frame 22, drive unit 3 and electric unit 11 is described in the following with reference to FIGS. 3 and 9. In FIG. 9, some of the components are omitted from the illustration for the convenience of illustration. When joining the upper and lower structures 13 and 14 to each other, the lower opening 25 of the upper frame 21 is opposed to the upper opening 31 of the lower frame 22, and the first guide pin 215 of the lower structure 14 is fitted into the first guide hole 298 of the upper structure 13 while the second guide pin 217 of the lower structure 14 is fitted into the second guide hole 302 of the upper structure 13. This causes the first connector 214 to be connected to the third connector 297, and the second connector 216 to the fourth connector 301. Thereby, the upper and lower structures 13 and 14 are electrically connected to each other so that distribution of electric power and transmission of control signals can be effected between the upper and lower structures 13 and 14.

The lower surface of the wall part of the upper frame 21 defining the recess 29 abuts the upper surface of the connecting member base 210 connected to the input shaft 206 of the upper load sensor 6, and the free end of the input shaft 206 is passed upward through the central connecting hole 30 of the recess 29. By threading a nut 314 onto the input shaft 206, the bottom wall of the recess 29 is firmly held between the connecting member base 210 and nut 314, and the upper frame 21 is supported by the input shaft 206 of the upper load sensor 6. The upper opening 31 of the lower frame 22 is slightly smaller that the lower opening 25 of the upper frame 21 so that the peripheral wall defining the upper opening 31 is received by the lower opening 25 of the upper frame 21.

Thus, the upper structure 13 is supported by the lower structure 14 solely via the load sensor 6 so that the load created by the seating of a vehicle occupant D on the seat assembly 4 is transmitted to the input shaft 206 of the upper load sensor 6 via the upper structure 13.

As shown in FIG. 10, the control circuit 261 receives signals from the upper load sensor 6, inclination sensor 7, step load sensors 8, rotary encoders 9 and battery management circuit 285 via the input interface circuit 265. The control circuit 261 is configured to generate PWM signals for driving the left driver circuit 253 and right driver circuit 254 via the output interface circuit 266 so as to maintain the vehicle 1 in an upright posture or perform the inverted pendulum control according to the received signals.

The upper load sensor 6 forwards a signal corresponding to the load applied to the input shaft 206 to the control circuit 261. Each step load sensor 8 forwards a signal corresponding to the load applied to the corresponding step 183 to the control circuit 261. The inclination sensor 7 forwards a signal corresponding to the inclination thereof with respect to a prescribed reference line to the control circuit 261. Each rotary encoder 9 forwards a signal corresponding to the angular position of the corresponding rotor shaft (output shaft) 96 to the control circuit 261.

The control circuit 261 computes the load applied to the input shaft 206 according to the signal received from the upper load sensor 6, and determines if a vehicle occupant is seated on the seat assembly 4 by comparing the computed load with a prescribed threshold value. The control circuit 261 also computes the loads applied to the steps 183 according to the signals from the step load sensors 8, and determines if and how the vehicle occupant is placing his or her feet on the steps 183 by comparing the computed loads with prescribed threshold values.

According to the results of determining if a vehicle occupant is seated on the seat assembly 4 and if the vehicle occupant is placing his or her feet on the steps 183, the control circuit 261 determines the presence of a vehicle occupant and the riding posture of the vehicle occupant. In the illustrated vehicle 1, as shown in FIG. 12, the vehicle occupant D may ride the vehicle 1 either in a sitting posture as indicated by (a) by sitting on the seat assembly 4 or in a standing posture by standing on the steps 183 and interposing the seat assembly 4 (which is in the retracted position at such a time) or in particular the cushion parts thereof with the knees and thighs of the vehicle occupant as indicated by (b). When no one is sitting on the seat assembly 4 and no feet are placed on the steps 183, it is then determined that there is no vehicle occupant on the vehicle 1. If someone is detected sitting on the seat assembly 4 with the upper load sensor 6, it can be determined that there is a vehicle occupant in the sitting posture. If the presence of feet on the steps 183 is determined by using the step load sensors 8, it can be determined that there is a vehicle occupant in the standing posture.

The control circuit 261 computes the rotational speeds of the two electric motors 82 according to the signals from the rotary encoders 9, and use the obtained speeds for the drive control of the two electric motors 82.

The control circuit 261 computes an inclination angle $\theta$ of the axial line B connecting the rotational center A of the main wheel 85 and the gravitational center of the vehicle 1 including the vehicle occupant D with respect to a vertical (plumb) line according to the signal from the inclination sensor 7 by using an inclination angle determining unit 269 configured to execute a prescribed computing process. FIG. 11$b$ shows the state where $\theta$ has a small value which may be a prescribed reference value. In the xyz rectilinear coordinate system having an x-axis extending in the fore and aft direction (positive in the forward direction and negative in the rearward direction), a y-axis extending in the lateral direction (positive in the rightward direction and negative in the leftward direction) and a z-axis extending in the vertical direction (positive in the upward direction and negative in the downward direction), the inclination angle $\theta$ may have an x-component $\theta x$ or an inclination angle in the x-axis direction, and a y-component $\theta y$ or an inclination angle in the y-axis direction.

The control circuit 261 performs the inverted pendulum control according to the inclination angle $\theta$. In the inverted pendulum control, the vehicle 1 is moved by using the drive unit 3 so that the combined gravitational center of the vehicle 1 itself and vehicle occupant is positioned approximately above the road contact point of the drive unit 3 (main wheel 85), and the inclination angle $\theta$ coincides with a reference angle $\theta t$ given as a control target value. As the position of the combined gravitational center varies depending on the presence of the vehicle occupant and the riding posture of the vehicle occupant, the reference angle $\theta t$ is defined individually for the vehicle 1 without a vehicle occupant, the vehicle carrying a vehicle occupant in a sitting posture and the vehicle carrying a vehicle occupant in a standing posture.

The control circuit 261 generates PWM signals for controlling the left driver circuit 253 and right driver circuit 254 so as to agree the inclination angle $\theta$ with the reference angle $\theta t$ for each of the vehicle occupant situations. According to the given PWM signals, the left driver circuit 253 and right driver circuit 254 supply electric power to the electric motors 82 to actuate them in a corresponding manner.

The structure described in the foregoing allows the vehicle 1 to maintain an upright posture in which the axial line of the lower structure 14 agrees with the reference angle θt by virtue of the inverted pendulum control. The vehicle 1 is driven by the vehicle operator shifting his or her weight in a prescribed direction. When the weight of the vehicle operator is shifted in a desired direction, the axial line of the lower structure tilts in the desired direction. The control circuit 261 then drives the drive unit 3 so as to agree the inclination angle with the reference angle of the corresponding vehicle occupant situation, and this causes the vehicle to travel in the desired direction.

In the vehicle described above, because the drive unit 3 and battery unit 10 which account for a large part of the weight of the vehicle 1 are spaced away from each other in a vertical direction, and the inclination angle sensor 7 is placed between them, not only the vehicle can be constructed in a highly compact manner but also the inclination angle sensor 7 can be placed approximately on the gravitational center of the vehicle 1 or in the narrow section 2A. This contributes to the minimization in the error in estimating the acceleration (or the inclination angle of the vehicle 1) based on the detection result of the inclination angle sensor 7, and this improves the control response of the system. Furthermore, as the weight of the vehicle is balanced along the lengthwise (vertical) direction thereof, the transportation of the vehicle 1, for instance by orienting it sideways, can be facilitated.

In the foregoing embodiment, because the seat assembly 4 is provided on the upper frame 21, the weight of the seat assembly 4 combined with the weight of the battery unit 10 helps to match the weight of the upper structure with that of the lower structure (which is normally heavier owing to the presence of the drive unit 3). Also, the presence of the steps 183 in the lower frame 22 allow the load of the vehicle occupant to be distributed between the upper frame 21 and lower frame 22, and this not only contributes to the even distribution of the load on the frame 2 but also helps the gravitational center of the vehicle 1 to coincide with the position of the inclination angle sensor.

Although the present invention has been described in terms of a preferred embodiment thereof, it is obvious to a person skilled in the art that various alterations and modifications are possible without departing from the scope of the present invention which is set forth in the appended claims. For instance, the foregoing embodiment was directed to a monocycle type vehicle, but may also be applied to vehicles using different number of wheels, crawlers, bipedal mechanisms and other modes of propulsion.

The contents of the original Japanese patent applications on which the Paris Convention priority claim is made for the present application are incorporated in this application by reference.

The invention claimed is:

1. An inverted pendulum type vehicle having a hollow shell frame having a prescribed shape, the hollow shell frame including a lower frame and an upper frame detachably joined to an upper end of the lower frame, the lower and upper frames each defining a hollow interior, comprising:
a drive unit incorporated in the lower frame;
a battery unit received in the upper frame and configured to supply electric power to the drive unit,
wherein the hollow shell frame comprises a hollow interior defined by the upper frame and the lower frame when the upper frame and the lower frame are attached to one another, a single wheel is disposed in the hollow interior, and the upper frame is provided with a load supporting member; and
an electric unit for controlling supply of electric power from the battery unit to the drive unit, the electric unit being supported by at least one of the upper and lower frames and located in a part substantially intermediate between the battery unit and the drive unit and a load sensor provided in the electric unit for detecting a load acting upon the load supporting member and transmitted thereto via at least a part of the upper frame.

2. The inverted pendulum type vehicle according to claim 1, wherein the drive unit comprises an annular main wheel, an electric motor for rotatively actuating the main wheel and a drive assembly for transmitting an output power of the electric motor to the main wheel.

3. The inverted pendulum type vehicle according to claim 1, wherein the electric unit is provided with an inverted pendulum control unit, and an inclination sensor for providing inclination angle data to the inverted pendulum control unit is supported by at least one of the upper and lower frames and located in a part substantially intermediate between the battery unit and the drive unit.

4. The inverted pendulum type vehicle according to claim 1, wherein the load supporting member comprises a seat for supporting buttocks of a vehicle occupant, and the lower frame is provided with a pair of steps for supporting feet of the vehicle occupant.

5. The inverted pendulum type vehicle according to claim 1, wherein the electric unit comprises an inclination sensor for detecting an inclination angle thereof with respect to a vertical plumb line, a motor driver circuit board for controlling an electric motor of the drive unit, and a power source circuit board for supplying electric power to the drive unit.

6. The inverted pendulum type vehicle according to claim 5, wherein the electric unit further comprises a cooling air blower fan, and the motor driver circuit board defines an at least a part of a cooling air passage of the cooling air blower fan.

7. The inverted pendulum type vehicle according to claim 5, wherein the electric unit further comprises a cooling air blower fan, and at least one of the upper and lower frames is provided with a vent opening corresponding in position to a cooling passage of the cooling air blower fan.

8. The inverted pendulum type vehicle according to claim 5, wherein the electric unit further comprises a control circuit board for controlling motion of the vehicle at least according an output of the inclination sensor, and the inclination sensor and power source circuit board are located one above the other while the control circuit board extends vertically on a side of the inclination sensor and power source circuit board between the inclination sensor and power source circuit board.

9. The inverted pendulum type vehicle according to claim 8, wherein the power source circuit board extends substantially horizontally.

10. The inverted pendulum type vehicle according to claim 8, wherein a power line electrically connecting the battery unit in the upper frame with the power source circuit board extends on the other side of the inclination sensor and power source circuit board opposite from the control circuit board.

11. An inverted pendulum type vehicle having a lower frame and an upper frame detachably joined to an upper end of the lower frame, the lower and upper frames each defining a hollow interior, comprising:
a drive unit incorporated in the lower frame; and
a battery unit received in the upper frame and configured to supply electric power to the drive unit,
wherein the upper frame is provided with an annular shape defining a hollow interior and a central opening, the hollow interior receiving the battery unit therein, and the central opening configured to store a retractable seat assembly of a vehicle occupant when the seat assembly is in a retracted state.

12. An inverted pendulum type vehicle having a lower frame and an upper frame detachably joined to an upper end of the lower frame, the lower and upper frames each defining a hollow interior, comprising:

a drive unit incorporated in the lower frame;

a battery unit received in the upper frame and configured to supply electric power to the drive unit; and an electric unit for controlling supply of electric power from the battery unit to the drive unit, the electric unit being supported by at least one of the upper and lower frames and located in a part substantially intermediate between the battery unit and the drive unit, wherein the electric unit comprises an inclination sensor for detecting an inclination angle thereof with respect to a vertical plumb line, a motor driver circuit board for controlling an electric motor of the drive unit, and a power source circuit board for supplying electric power to the drive unit, wherein the electric unit further comprises a control circuit board for controlling motion of the vehicle at least according an output of the inclination sensor, and the inclination sensor and power source circuit board are located one above the other while the control circuit board extends vertically on a side of the inclination sensor and power source circuit board between the inclination sensor and power source circuit board, and wherein the electric unit is mounted on the lower frame, and is provided with a connector configured to be electrically connected to a corresponding connector provided on the upper frame, the lower and upper frames are provided with complementary guide members that allow the connectors to be connected to each other when the upper and lower frames are physically joined to each other.

* * * * *